United States Patent
Sato

(10) Patent No.: US 9,791,665 B2
(45) Date of Patent: Oct. 17, 2017

(54) IMAGING LENS AND IMAGING APPARATUS

(71) Applicant: FUJIFILM Corporation, Tokyo (JP)

(72) Inventor: Kenichi Sato, Saitama (JP)

(73) Assignee: FUJIFILM Corporation, Tokyo (JP)

(*) Notice: Subject to any disclaimer, the term of this patent is extended or adjusted under 35 U.S.C. 154(b) by 200 days.

(21) Appl. No.: 14/948,749

(22) Filed: Nov. 23, 2015

(65) Prior Publication Data

US 2016/0147041 A1    May 26, 2016

(30) Foreign Application Priority Data

Nov. 25, 2014  (JP) ................... 2014-237447

(51) Int. Cl.
| | | |
|---|---|---|
| G02B 9/00 | (2006.01) | |
| G02B 25/00 | (2006.01) | |
| G02B 13/02 | (2006.01) | |
| G02B 13/04 | (2006.01) | |
| G02B 9/34 | (2006.01) | |
| G02B 9/58 | (2006.01) | |
| G02B 9/64 | (2006.01) | |
| G02B 15/177 | (2006.01) | |

(52) U.S. Cl.
CPC ............ G02B 9/64 (2013.01); G02B 13/04 (2013.01); G02B 15/177 (2013.01)

(58) Field of Classification Search
CPC ........ G02B 13/00; G02B 13/04; G02B 13/24; G02B 15/177; G02B 3/00; G02B 25/001; G02B 13/16; G02B 21/02; G02B 9/34; G02B 13/02
USPC ....... 359/740, 686, 680, 642, 644, 650, 660, 359/715, 734, 747, 753, 771, 781–782
See application file for complete search history.

(56) References Cited

U.S. PATENT DOCUMENTS

| | | | |
|---|---|---|---|
| 4,705,364 A | 11/1987 | Wakamiya | |
| 2012/0075729 A1 | 3/2012 | Uemura | |

FOREIGN PATENT DOCUMENTS

| | | |
|---|---|---|
| JP | S61-279815 A | 12/1986 |
| JP | H08-313803 A | 11/1996 |
| JP | 2010-113248 A | 5/2010 |
| JP | 2013-130820 | 7/2013 |

OTHER PUBLICATIONS

A Search Report issued by the German Patent and Trademark Office dated Jul. 13, 2016, which corresponds to German Patent Application No. 10 2015 120 219.0 and is related to U.S. Appl. No. 14/948,749; with English language translation.

*Primary Examiner* — Dawayne A Pinkney
(74) *Attorney, Agent, or Firm* — Studebaker & Brackett PC

(57) ABSTRACT

An imaging lens is substantially constituted by: a negative first lens group; a positive second lens group; an aperture stop; a positive third lens group; and a negative fourth lens group; provided in this order from an object side. The first lens group is constituted only by two or more negative lenses. The second lens group has a positive lens at the most object side thereof. The third lens group has a negative lens having a concave surface toward the object side at the most object side thereof. The fourth lens group is constituted by a single negative lens. The fourth lens group moves from the object side to an image side when changing focus from an object at infinity to an object at an extremely close distance. Only the fourth lens group moves during focusing operations.

20 Claims, 10 Drawing Sheets

EXAMPLE 1

EXAMPLE 1

EXAMPLE 2

EXAMPLE 3

EXAMPLE 4

EXAMPLE 5

EXAMPLE 6

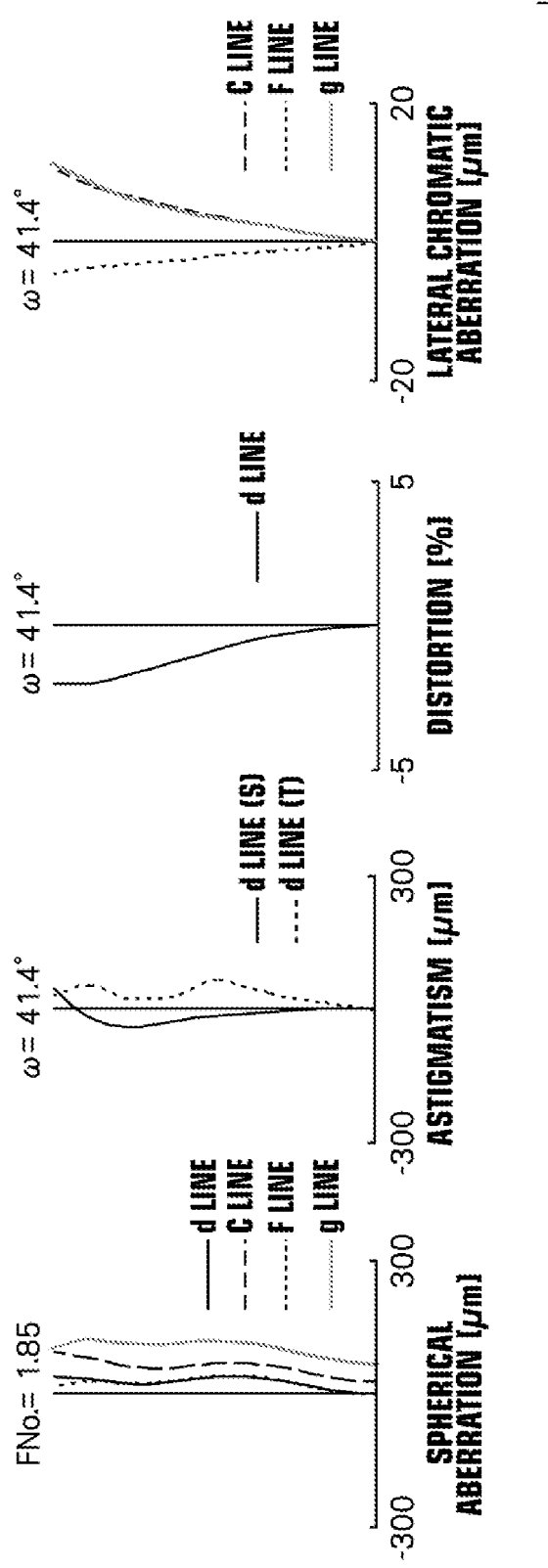

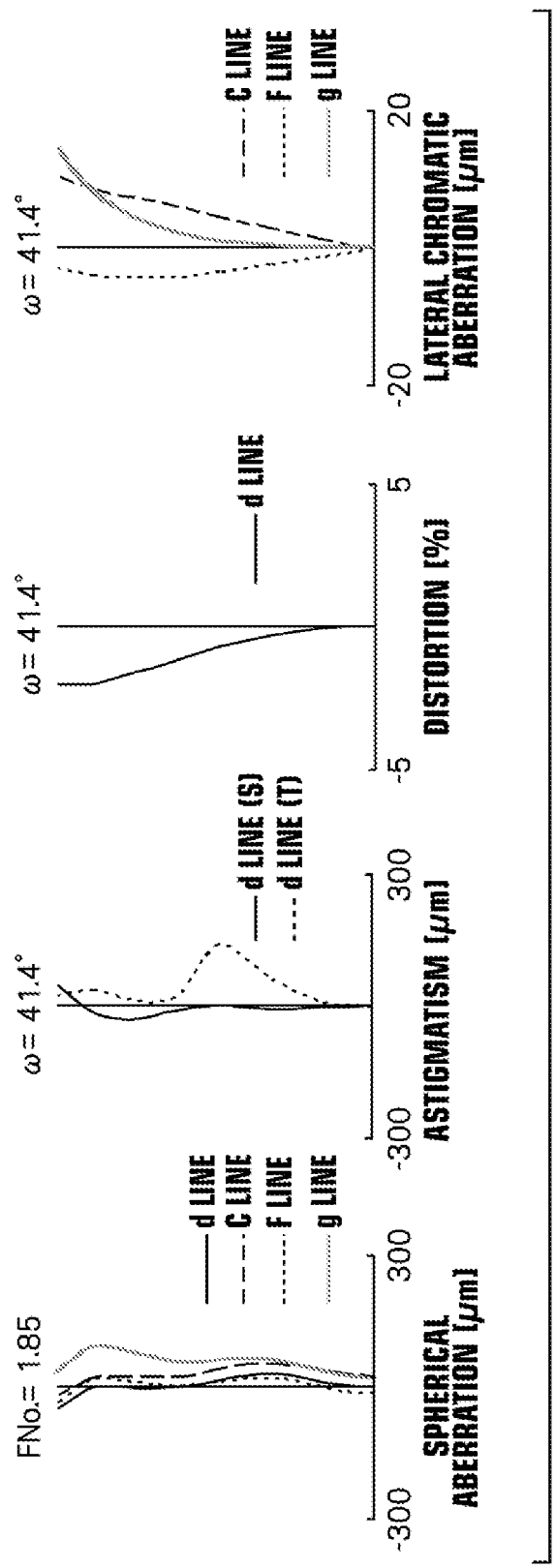

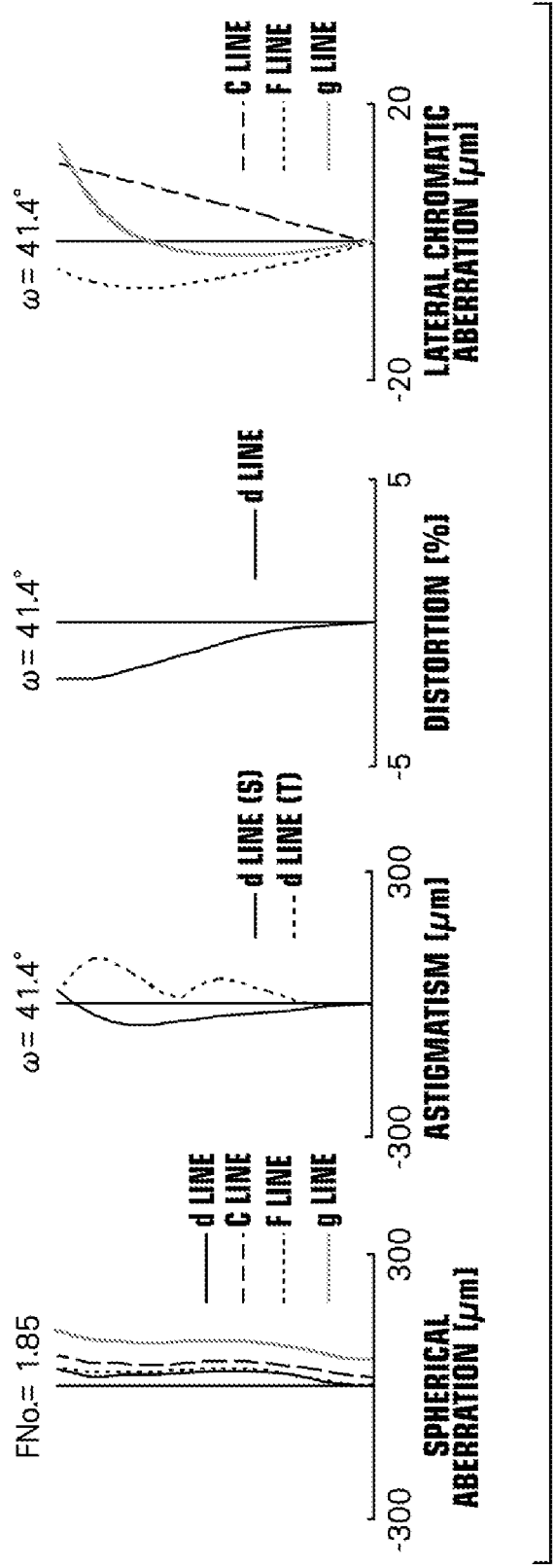

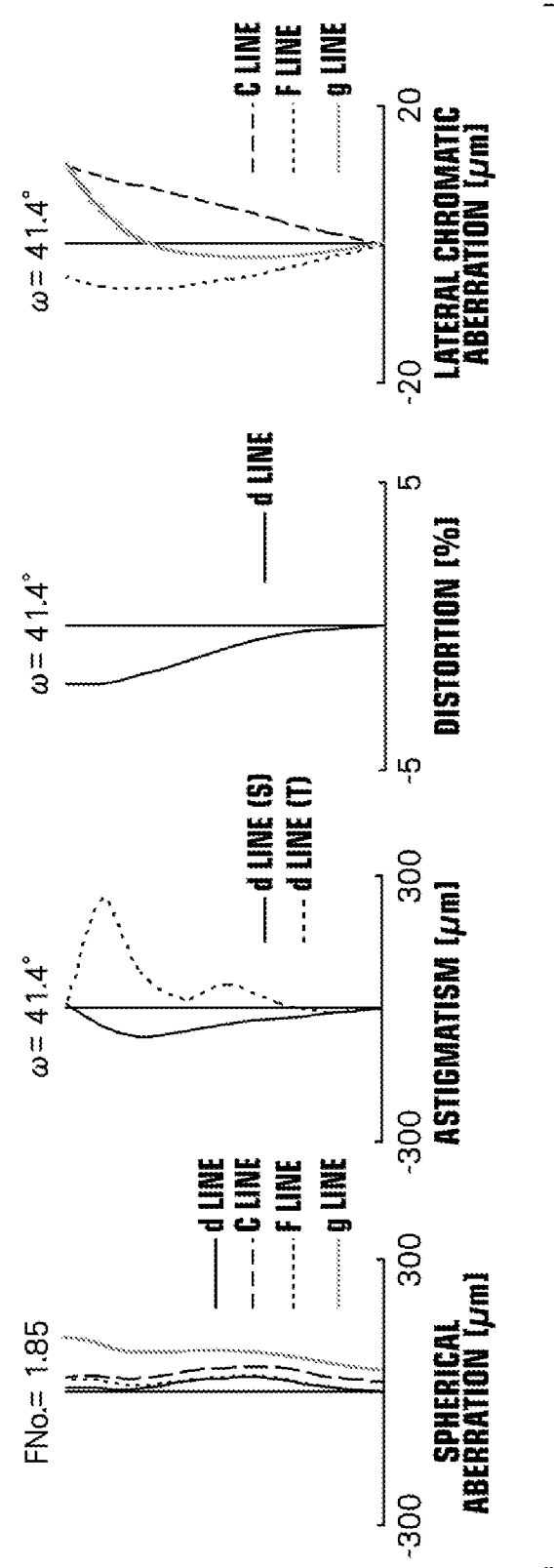

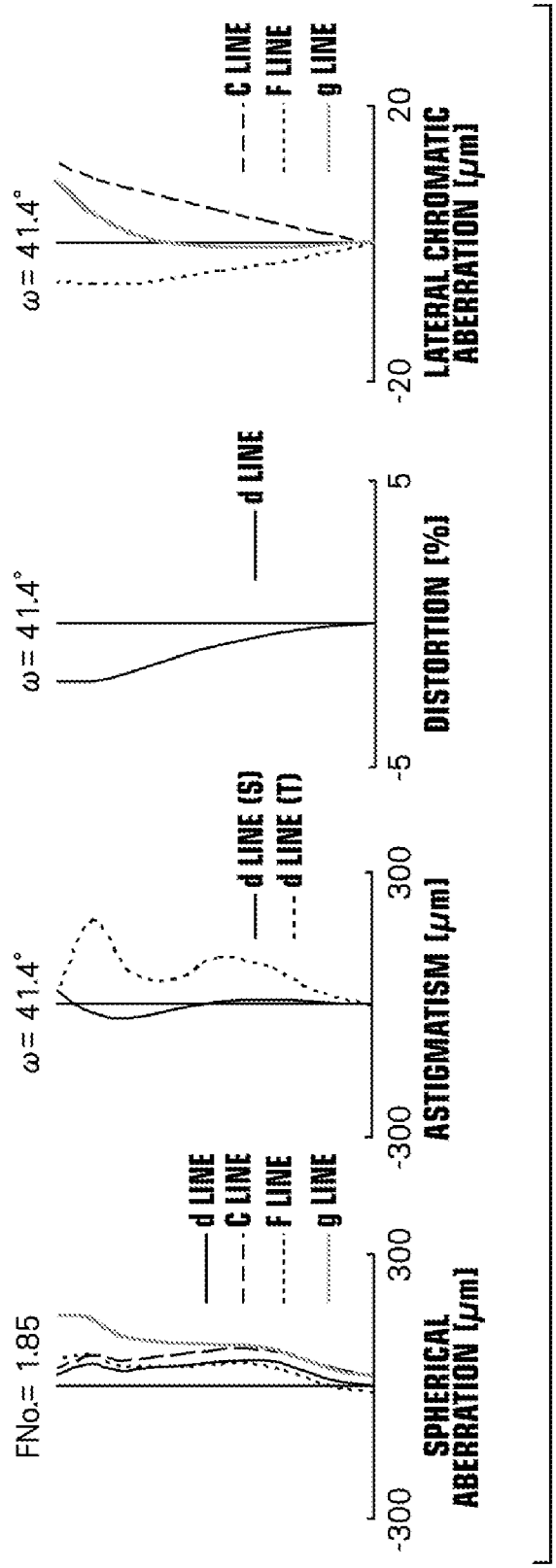

… (1/2)

IMAGING LENS AND IMAGING APPARATUS

CROSS REFERENCE TO RELATED APPLICATIONS

The present application claims priority under 35 U.S.C. §119 to Japanese Patent Application No. 2014-237447 filed on Nov. 25, 2014. The above application is hereby expressly incorporated by reference, in its entirety, into the present application.

BACKGROUND

The present disclosure is related to an imaging lens. More particularly, the present disclosure is related to an imaging lens which is suited for use in digital cameras and the like. In addition, the present disclosure is related to an imaging apparatus equipped with such an imaging lens.

Recently, there is demand to widen the angles of view of imaging lenses which are employed in imaging apparatuses such as digital cameras. The negative lead type lens systems disclosed in Japanese Unexamined Patent Publication Nos. 61(1986)-279815 and 2010-113248 are known as lens systems which are capable of being configured to have wide angles of view. A negative lead type lens system is provided with a negative lens group at the most object side and a positive lens group toward the image side of the negative lens group. In addition, Japanese Unexamined Patent Publication No. 8(1996)-313803 discloses a wide angle lens system for use as a photography lens, and Japanese Unexamined Patent Publication No. 2013-130820 proposes a lens system which is capable for use in a digital camera. Japanese Unexamined Patent Publication No. 8(1996)-313803 discloses a lens system constituted by a negative lens group, a positive lens group that includes an aperture stop, and a negative lens group, provided in this order from the object side, in which a portion of the lens groups is moved to perform focusing operations. Japanese Unexamined Patent Publication No. 2013-130820 discloses a lens system constituted by a negative lens group, a positive lens group, an aperture stop, a positive lens group, and a focusing lens group, provided in this order from the object side.

SUMMARY

It is desired for lens systems to have small F numbers to enable favorable photography even under low light conditions and to have high performance, in addition to having a wide angle of view, in digital cameras and the like. Further, there is also demand for focusing operations to be faster and more rapidly performed, from the viewpoint of ease of use for users. For this reason, it is desired for focusing lens groups that move during focusing operations to be lightweight. There is increased competition in development in the market of imaging apparatuses, and an imaging lens that meets all of the above demands is desired.

However, it cannot be said that the F number of the lens system disclosed in Japanese Unexamined Patent Publication No. 61(1986)-279815 is sufficiently small enough to meet recent demands. In addition, Japanese Unexamined Patent Publication No. 61(1986)-279815 is silent regarding reducing the weight of focusing lens groups. A wider angle of view is desirable in the lens system disclosed in Japanese Unexamined Patent Publication No. 2010-113248 in order to meet recent demands. It cannot be said that the lens system disclosed in Japanese Unexamined Patent Publication No. 8(1996)-313803 meets recent demands for widening of the angle of view. In addition, Japanese Unexamined Patent Publication No. 8(1996)-313803 discloses a lens system that adopts the inner focus method, in which the focusing lens group is constituted by a plurality of lenses. Therefore, there is room for improvement with respect to weight reduction of the focusing lens group. The angle of view of the lens system disclosed in Japanese Unexamined Patent Publication No. 2013-130820 is insufficient.

The present disclosure has been developed in view of the foregoing circumstances. The present disclosure provides an imaging lens that can realize a small F number, a wide angle of view, a lightweight focusing lens group, and favorable optical performance. The present disclosure also provides an imaging apparatus equipped with such an imaging lens.

A first imaging lens of the present disclosure substantially consists of, in order from the object side to the image side:

a first lens group having a negative refractive power as a whole;

a second lens group having a positive refractive power as a whole;

an aperture stop;

a third lens group having a positive refractive power as a whole; and a fourth lens group having a negative refractive power as a whole;

the first lens group substantially consisting only of two or more negative lenses;

the second lens group having a positive lens at the most object side thereof;

the third lens group having three positive lenses and a negative lens having a concave surface toward the object side at the most object side thereof;

the fourth lens group substantially consisting only of a single negative lens, the fourth lens group moving from the object side to an image side when changing focus from an object at infinity to an object at an extremely close distance; and only the fourth lens group moving during focusing operations.

In the first imaging lens of the present disclosure, it is preferable for the lens most toward the object side within the first lens group to be a meniscus lens having a convex surface toward the object side.

A second imaging lens of the present disclosure substantially consists of, in order from the object side to the image side:

a first lens group having a negative refractive power as a whole;

a second lens group having a positive refractive power as a whole; an aperture stop;

a third lens group having a positive refractive power as a whole; and a fourth lens group having a negative refractive power as a whole;

the first lens group substantially consisting only of two or more negative lenses and the lens surface most toward the object side within the first lens group being convex;

the second lens group having a positive lens at the most object side thereof, and the number of positive lenses within the second lens group being two;

the third lens group having a negative lens with a concave surface toward the object side at the most object side thereof;

the fourth lens group substantially consisting only of a single negative lens, the fourth lens group moving from the object side to an image side when changing focus from an object at infinity to an object at an extremely close distance; and only the fourth lens group moving during focusing operations.

In the first and second imaging lenses of the present disclosure, it is preferable for the second lens group to have two positive lenses and to satisfy Conditional Formula (1) below:

$$-90 < vdG2P1 - vdG2P2 < -15 \quad (1)$$

wherein vdG2P1 is the Abbe's number of the positive lens most toward the object side within the second lens group with respect to the d line, and vdG2P2 is the Abbe's number of the second positive lens from the object side within the second lens group with respect to the d line.

A third imaging lens of the present disclosure substantially consists of, in order from the object side to the image side:

a first lens group having a negative refractive power as a whole;

a second lens group having a positive refractive power as a whole; an aperture stop;

a third lens group having a positive refractive power as a whole; and a fourth lens group having a negative refractive power as a whole;

the first lens group substantially consisting only of two or more negative lenses;

the second lens group having a positive lens at the most object side thereof, and the number of positive lenses within the second lens group being two;

the third lens group having a negative lens with a concave surface toward the object side at the most object side thereof;

the fourth lens group substantially consisting only of a single negative lens, the fourth lens group moving from the object side to an image side when changing focus from an object at infinity to an object at an extremely close distance;

only the fourth lens group moving during focusing operations; and the imaging lens satisfying Conditional Formula (1) below:

$$-90 < vdG2P1 - vdG2P2 < -15 \quad (1)$$

wherein vdG2P1 is the Abbe's number of the positive lens most toward the object side within the second lens group with respect to the d line, and vdG2P2 is the Abbe's number of the second positive lens from the object side within the second lens group with respect to the d line.

In the first through third imaging lenses of the present disclosure, it is preferable for the negative lens within the fourth lens group to be a meniscus lens having a concave surface toward the image side.

It is preferable for the first through third imaging lenses of the present disclosure to satisfy any one or arbitrary combinations of Conditional Formulae (2) through (7) and (1-1) through (7-1) below.

$$-1 < f/f1 < -0.6 \quad (2)$$

$$0.4 < f/f2 < 0.8 \quad (3)$$

$$0.4 < f/f3 < 0.8 \quad (4)$$

$$-0.4 < f/f4 < -0.1 \quad (5)$$

$$0.4 < f \cdot \tan \omega / RL < 1.5 \quad (6)$$

$$0.6 < DG12/f < 1.8 \quad (7)$$

$$-80 < vdG2P1 - vdG2P2 < -20 \quad (1\text{-}1)$$

$$-0.95 < f/f1 < -0.65 \quad (2\text{-}1)$$

$$0.55 < f/f2 < 0.75 \quad (3\text{-}1)$$

$$0.55 < f/f3 < 0.75 \quad (4\text{-}1)$$

$$-0.3 < f/f4 < -0.15 \quad (5\text{-}1)$$

$$0.7 < f \cdot \tan \omega / RL < 1.1 \quad (6\text{-}1)$$

$$0.7 < DG12/f < 1.5 \quad (7\text{-}1)$$

wherein f is the focal length of the entire system, f1 is the focal length of the first lens group, f2 is the focal length of the second lens group, f3 is the focal length of the third lens group, f4 is the focal length of the fourth lens group, w is the half angle of view, RL is the paraxial radius of curvature of the lens surface most toward the image side, DG12 is the distance between the first lens group and the second lens group along the optical axis, vdG2P1 is the Abbe's number of the positive lens most toward the object side within the second lens group with respect to the d line, and vdG2P2 is the Abbe's number of the second positive lens from the object side within the second lens group with respect to the d line.

An imaging apparatus of the present disclosure is characterized by being equipped with an imaging lens of the present disclosure.

Note that the expression "lens group" as used above is not limited to those which are constituted by a plurality of lenses, and also refer to lens groups which are constituted by a single lens.

Note that the term "substantially" within the expression "substantially consists of" above means that the imaging lens may also include lenses that practically do not have any power, optical elements other than lenses such as a stop and a cover glass, and mechanical components such as lens flanges, a lens barrel, an imaging element, a camera shake correcting mechanism, etc., in addition to the constituent elements listed above.

Note that in the imaging lenses of the present disclosure, the symbols of the refractive powers and the surface shapes of the lenses are those in the paraxial region for lenses that include aspherical surfaces.

Note that the numbers of lenses in the imaging lenses of the present disclosure are the numbers of lenses which are constituent elements thereof. For example, the number of lenses of a cemented lens formed by cementing a plurality of single lenses of different materials is counted as the number of the single lenses that constitute the cemented lens. However, in the present disclosure, hybrid aspherical lenses (lenses formed by a spherical lens and an aspherical film laminated on the spherical lens) are not considered to be cemented lenses, and are treated as single lenses.

In the imaging lenses of the present disclosure, the lens groups are provided such that the arrangements of refractive powers are negative, positive, aperture stop, positive, and negative from the object side. The configuration of each lens group is set favorably, and focusing lens groups are constituted by single lenses. Therefore, a small F number, a wide angle of view, weight reduction of a focusing lens group, and favorable optical performance can be realized.

The imaging apparatus of the present disclosure is equipped with an imaging lens of the present disclosure. Therefore, the imaging apparatus has a wide angle of view, is capable of favorably performing photography even under low light conditions, is capable of high speed focusing operations, and can obtain favorable images.

BRIEF DESCRIPTION OF THE DRAWINGS

FIG. 8 is a collection of diagrams that illustrate various aberrations of the imaging lens according to Example 2, which are spherical aberration, astigmatism, distortion, and lateral chromatic aberration in this order from the left side of the drawing sheet.

FIG. 9 is a collection of diagrams that illustrate various aberrations of the imaging lens according to Example 3, which are spherical aberration, astigmatism, distortion, and lateral chromatic aberration in this order from the left side of the drawing sheet.

FIG. 10 is a collection of diagrams that illustrate various aberrations of the imaging lens according to Example 4, which are spherical aberration, astigmatism, distortion, and lateral chromatic aberration in this order from the left side of the drawing sheet.

FIG. 11 is a collection of diagrams that illustrate various aberrations of the imaging lens according to Example 5, which are spherical aberration, astigmatism, distortion, and lateral chromatic aberration in this order from the left side of the drawing sheet.

FIG. 12 is a collection of diagrams that illustrate various aberrations of the imaging lens according to Example 6, which are spherical aberration, astigmatism, distortion, and lateral chromatic aberration in this order from the left side of the drawing sheet.

DETAILED DESCRIPTION OF THE PREFERRED EMBODIMENTS

Hereinafter, embodiments of the present disclosure will be described in detail with reference to the attached drawings. FIG. 1 through FIG. 6 are cross sectional diagrams that illustrate the configurations of imaging lenses according to embodiments of the present disclosure that respectively corresponds to imaging lenses of Example 1 through Example 6 to be described later. The basic configurations of the Examples illustrated in FIG. 1 through FIG. 6 and the manners in which the configurations are illustrated are the same. Therefore, the imaging lenses according to the embodiments of the present disclosure will be described mainly with reference to FIG. 1.

An imaging lens 1 according to the present embodiment is a fixed focal point optical system, and substantially consists of a first lens group G1, a second lens group G2, an aperture stop St, a third lens group G3, and a fourth lens group G4, provided in this order from the object side. Note that the aperture stop St illustrated in FIG. 1 does not represent the size or the shape thereof, but illustrates the position thereof along the optical axis. In addition, the left side is the object side and the right side is the image side in FIG. 1. An axial light beam 2 from an object and a light beam 3 at a maximum angle of view at an infinite distance are also illustrated in FIG. 1.

Figure 1:
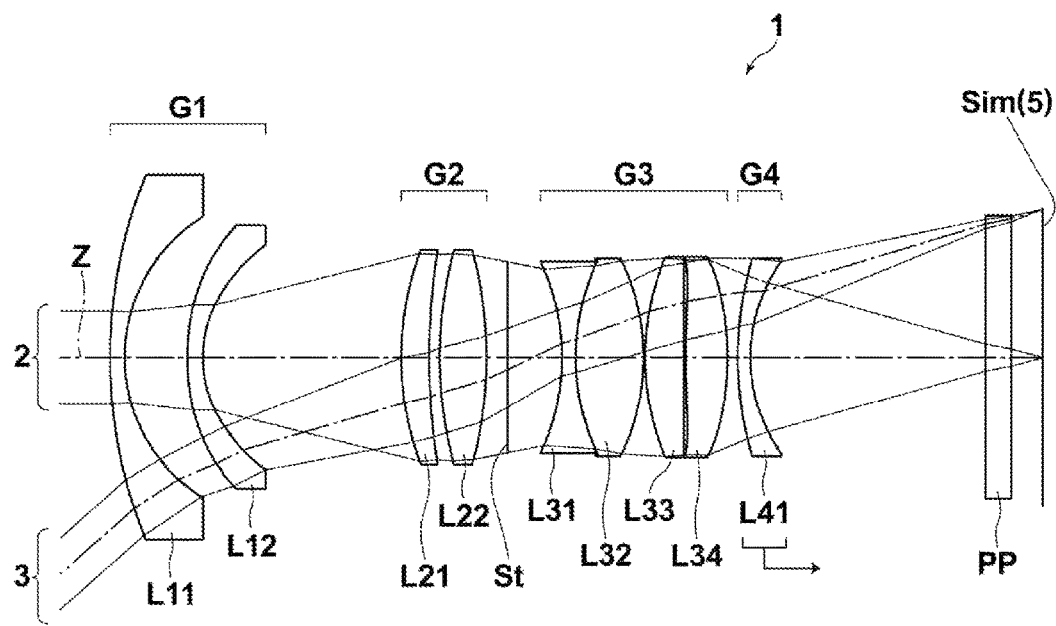
FIG. 1 is a sectional diagram that illustrates the lens configuration of a imaging lens according to Example 1 of the present disclosure and the paths of rays of light.

In the example illustrated in FIG. 1, the first lens group G1 is constituted by two lenses, which are a lens L11 and a lens L12, provided in this order from the object side. The second lens group G2 is constituted by two lenses, which are a lens L21 and a lens L22, provided in this order from the object side. The third lens group G3 is constituted by four lenses, which are lenses L31 through L34, provided in this order from the object side. The fourth lens group G4 is constituted by one lens, which is a lens L41.

This imaging lens 1 may be mounted in an imaging apparatus such as a digital camera. In the imaging apparatus, an imaging element 5 such as a CCD (Charge Coupled Device) and a CMOS (Complementary Metal Oxide Semiconductor) is provided such that the imaging surface thereof is positioned at an image formation plane Sim of the imaging lens. FIG. 1 schematically illustrates the imaging element 5. In addition, it is preferable for a cover glass for protecting the imaging surface of the imaging element 5 and various filters, such as a low pass filter and an infrared cutoff filter, depending on the specification of the imaging apparatus, to be provided. FIG. 1 illustrates an example in which a parallel plate shaped optical member PP that presumes the presence of these elements is provided between the lens system and the image formation plane Sim. However, a configuration in which the optical member PP is omitted is also possible in the present disclosure.

The first lens group G1 has a negative power as a whole. Thereby, the incident angles of rays of light at peripheral angles of view that enter the lens groups provided toward the image side of the first lens group G1 can be decreased, which is advantageous from the viewpoint of widening the angle of view. In addition, the first lens group G1 substantially consists only of two or more negative lenses. By distributing refractive power among the two or more negative lenses, the amount of generated distortion can be reduced.

It is preferable for the first lens group G1 to be constituted only by two or three negative lenses. In the case that this configuration is adopted, an increase in the weight of the first lens group can be prevented, while suppressing the amount of distortion which is generated. In addition, it is preferable for the lens surface most toward the object side within the first lens group G1 to be a convex surface. That is, it is preferable for the lens most toward the object side within the first lens group G1 to be a meniscus lens having a convex surface toward the object side. In the case that such a configuration is adopted, the amount of generated distortion can be suppressed, which is advantageous from the viewpoint of widening the angle of view.

Figure 2:
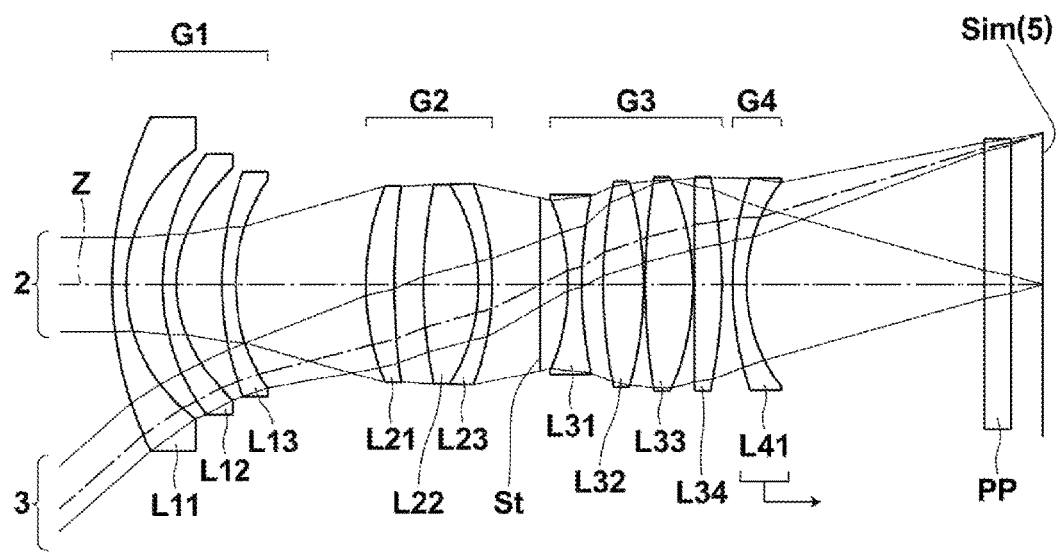
FIG. 2 is a sectional diagram that illustrates the lens configuration of a imaging lens according to Example 2 of the present disclosure and the paths of rays of light.

For example, the first lens group G1 of the example illustrated in FIG. 1 is constituted by the two lenses L11 and L12, which are meniscus lenses having convex surfaces toward the object side. A first lens group G1 of the example illustrated in FIG. 2 is constituted by three lenses L11 through L13, which are meniscus lenses having convex surfaces toward the object side.

The second lens group G2 has a positive refractive power as a whole. Adopting this configuration is advantageous from the viewpoint of favorably correcting distortion and lateral chromatic aberration. In addition, a positive lens is provided most toward the object side within the second lens group G2. Adopting this configuration is even more advantageous from the viewpoint of favorably correcting distortion and lateral chromatic aberration. Note that it is preferable for the number of positive lenses which are included in the second lens group to be only two, for the reasons to be described below. If distortion generated in the first lens group G1, which is a negative lens group, is corrected toward the object side of the aperture stop St, the distortion will be corrected by the second lens group G2, which is a positive lens group. If the intensity of the refractive power of the second lens group G2 is constant regardless of the number of lenses included within the second lens group G2 and the number of positive lenses within the second lens group G2 is three or greater, the positive refractive power will be distributed among each of the positive lenses. This will lead to a tendency for the absolute values of the radii of curvature of the positive lenses to increase. As a result, the correction performance with respect to distortion at peripheral angles of view will deteriorate. Accordingly, it is preferable for the number of positive lenses within the second lens group G2 to be only two.

Figure 3:
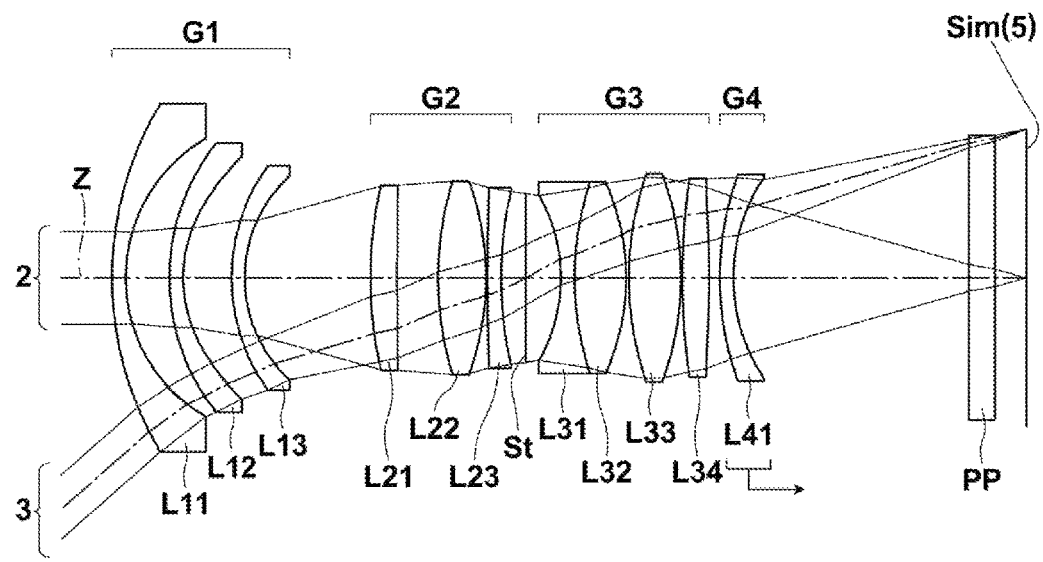
FIG. 3 is a sectional diagram that illustrates the lens configuration of a imaging lens according to Example 3 of the present disclosure and the paths of rays of light.

For example, the second lens group G2 of the example illustrated in FIG. 1 is constituted by the lens L21, which is a positive meniscus lens having a convex surface toward the object side, and the lens L22, which is a biconvex lens, provided in this order from the object side. A second lens group G2 of the example illustrated in FIG. 2 is constituted by a lens L21, which is a positive meniscus lens having a convex surface toward the object side, a lens L22, which is a biconvex lens, and a lens L23 which is a negative meniscus lens having a concave surface toward the object side, provided in this order from the object side. The lens L22 and the lens L23 are cemented together. A second lens group G2 of the example illustrated in FIG. 3 is constituted by a lens L21, which is a positive meniscus lens having a convex surface toward the object side, a lens L22, which is a biconvex lens, and a lens L23 which is a negative meniscus lens having a convex surface toward the object side, provided in this order from the object side. The lenses L21 through L23 in the example illustrated in FIG. 3 are all single lenses and are not cemented together. The third lens group G3 has a positive power as a whole. This configuration enables the positive refractive power of the entire system to be constituted by the third lens group G3 and the second lens group G2. A negative lens having a concave surface toward the object side is provided at the most object side of the third lens group G3. By adopting this configuration, spherical aberration and longitudinal chromatic aberration can be favorably corrected. Note that it is preferable for the third lens group to have three positive lenses for the reasons to be described below. If a negative lens group is provided most toward the object side in order to widen the angle of view, the heights of marginal axial rays of light that enter the third lens group G3 will become high. However, the amount of generated spherical aberration can be suppressed, and a widening of the angle of view and a large aperture ratio can be simultaneously achieved by the third lens group G3 having three positive lenses.

For example, the third lens group G3 of the example illustrated in FIG. 1 is constituted by the lens L31, which is a biconcave lens, the lens L32, which is a biconvex lens, and two positive lenses L33 and L34, provided in this order from the object side. The lens L31 and the lens L32 are cemented together. A third lens group G3 of the example illustrated in FIG. 2 is also constituted by a lens L31, which is a biconcave lens, a lens L32, which is a biconvex lens, and two positive lenses L33 and L34, provided in this order from the object side, provided in this order from the object side. However, the lenses L31 through L34 in the example illustrated in FIG. 2 are all single lenses and are not cemented together.

The fourth lens group G4 has a negative refractive power as a whole, and is constituted by a single negative lens. The fourth lens group G4 moves from the object side to the image side when changing focus from an object at infinity to an object at an extremely close distance. Only the fourth lens group moves during focusing operations. That is, the fourth lens group G4 functions as a focusing lens group that moves during focusing operations.

The weight of the focusing lens group can be reduced by the focusing lens group being constituted by a single lens. This reduction in weight can contribute to an improvement in focusing speed and miniaturization of an actuator that drives the focusing lens group during focusing operations. In addition, the fourth lens group G4 moves from the object side to an image side when changing focus from an object at infinity to an object at an extremely close distance. Thereby, variations in aberrations caused by changes in object distances can be suppressed even if the focusing lens group is constituted by a small number of lenses. It is preferable for the negative lens within the fourth lens group G4 to be a meniscus lens having a concave surface toward the image side. In the case that such a configuration is adopted, variations in spherical aberration and variations in astigmatism caused by changes in object distances can be suppressed.

Hereinafter, preferred configurations of the imaging lens 1 of the present embodiment related to conditional formulae will be described. In the case that the second lens group G2 has two positive lenses, it is preferable for the imaging lens 1 to satisfy Conditional Formula (1) below:

$$-90 < vdG2P1 - vdG2P2 < -15 \quad (1)$$

wherein vdG2P1 is the Abbe's number of the positive lens most toward the object side within the second lens group with respect to the d line, and vdG2P2 is the Abbe's number of the second positive lens from the object side within the second lens group with respect to the d line.

By configuring the imaging lens 1 such that the value of vdG2P1−vdG2P2 is not greater than or equal to the upper limit defined in Conditional Formula (1), it becomes possible to employ a material having a low Abbe's number as the material of the lens L21, which is the positive lens most toward the object side within the second lens group G2, and to employ a material having a high Abbe's number as the material of the lens L22, which is the second positive lens from the object side within the second lens group G2. Employing a material having a low Abbe's number as the material of the lens L21, in which the heights of off axis chief rays of light are high, is effective to correct lateral chromatic aberration, but the use of such a material also influences longitudinal chromatic aberration. However, by employing a material having a high Abbe's number as the material of the lens L22, which is closer to the aperture stop St than the lens L21, the influence on longitudinal chromatic aberration by the lens L21 and the lens L22 as a whole can be decreased. As a result, both lateral chromatic aberration and longitudinal chromatic aberration can be favorably corrected. By configuring the imaging lens 1 such that the value of vdG2P1−vdG2P2 is not less than or equal to the lower limit defined in Conditional Formula (1), lateral chromatic aberration becoming overcorrected can be prevented.

In addition, it is preferable for the imaging lens 1 of the present embodiment to satisfy any one or arbitrary combinations of Conditional Formulae (2) through (7) and (1-1) through (7-1) below.

$$-1 < f/f1 < -0.6 \tag{2}$$

$$0.4 < f/f2 < 0.8 \tag{3}$$

$$0.4 < f/f3 < 0.8 \tag{4}$$

$$-0.4 < f/f4 < -0.1 \tag{5}$$

$$0.4 < f \cdot \tan \omega / RL < 1.5 \tag{6}$$

$$0.6 < DG12/f < 1.8 \tag{7}$$

wherein f is the focal length of the entire system, f1 is the focal length of the first lens group, f2 is the focal length of the second lens group, f3 is the focal length of the third lens group, f4 is the focal length of the fourth lens group, 107 is the half angle of view, RL is the paraxial radius of curvature of the lens surface most toward the image side, and DG12 is the distance between the first lens group and the second lens group along the optical axis.

By configuring the imaging lens 1 such that the value of f/f1 is not greater than or equal to the upper limit defined in Conditional Formula (2), the incident angles of rays of light at peripheral angles of view that enter the lens groups provided toward the image side of the first lens group G1 can be decreased, which is advantageous from the viewpoint of widening the angle of view. By configuring the imaging lens 1 such that the value of f/f1 is not less than or equal to the lower limit defined in Conditional Formula (2), the amount of distortion which is generated can be suppressed.

Configuring the imaging lens 1 such that the value of f/f2 is not greater than or equal to the upper limit defined in Conditional Formula (3) is advantageous from the viewpoint of favorably correcting spherical aberration. Configuring the imaging lens 1 such that the value of f/f2 is not less than or equal to the lower limit defined in Conditional Formula (3) is advantageous from the viewpoint of favorably correcting distortion.

Configuring the imaging lens 1 such that the value of f/f3 is not greater than or equal to the upper limit defined in Conditional Formula (4) is advantageous from the viewpoint of favorably correcting spherical aberration. By configuring the imaging lens 1 such that the value of f/f3 is not less than or equal to the upper limit defined in Conditional Formula (4), the incident angles of chief rays of light at peripheral angles of view that enter the image formation plane Sim can be decreased, which is advantageous when the imaging lens 1 is utilized in combination with an imaging element.

By configuring the imaging lens 1 such that the value of f/f4 is not greater than or equal to the upper limit defined in Conditional Formula (5), the amount of movement of the fourth lens group G4 during focusing operations can be decreased. By configuring the imaging lens 1 such that the value of f/f4 is not less than or equal to the upper limit defined in Conditional Formula (5), variations in spherical aberration and variations in distortion can be suppressed when the object distance changes. By configuring the imaging lens 1 such that the value of f·tanω/RL is not greater than or equal to the upper limit defined in Conditional Formula (6), the amount of astigmatism which is generated can be suppressed. By configuring the imaging lens 1 such that the value of f·tan ω/RL is not less than or equal to the upper limit defined in Conditional Formula (6), variations in spherical aberration and variations in distortion can be suppressed when the object distance changes. Note that the half angle of view o is half the value of a full angle of view in a state in which the imaging lens 1 is focused on an object at an infinite distance.

By configuring the imaging lens 1 such that the value of DG12/f is not greater than or equal to the upper limit defined in Conditional Formula (7), the effective diameter of the lens most toward the object side within the first lens group GI can be suppressed, which is advantageous from the viewpoint of miniaturizing the lens system. By configuring the imaging lens 1 such that the value of DG12/f is not less than or equal to the upper limit defined in Conditional Formula (7), the incident angles of rays of light at peripheral angles of view that enter the second lens group G2 can be decreased without increasing the refractive power of the first lens group G1 to be excessively strong, which is advantageous both from the viewpoint of favorably correcting distortion and from the viewpoint of widening the angle of view.

In order to cause the advantageous effects related to Conditional Formulae (1) through (7) described above to become more prominent, it is more preferable for Conditional Formulae (1-1) through (7-1) to be satisfied instead of Conditional Formulae (1) through (7), respectively.

$$-80 < vdG2P1 - vdG2P2 < -20 \tag{1-1}$$

$$-0.95 < f/f1 < -0.65 \tag{2-1}$$

$$0.55 < f/f2 < 0.75 \tag{3-1}$$

$$0.55 < f/f3 < 0.75 \tag{4-1}$$

$$-0.3 < f/f4 < -0.15 \tag{5-1}$$

$$0.7 < f \cdot \tan \omega / RL < 1.1 \tag{6-1}$$

$$0.7 < DG12/f < 1.5 \tag{7-1}$$

Arbitrary combinations of the preferred configurations are possible. It is preferable for the configurations to be selectively adopted as appropriate, according to specifications required of the imaging lens. By adopting the preferable configurations as appropriate, an optical system having more favorable optical performance or an optical system which is compatible to higher specifications can be realized. Imaging lenses according to three aspects will be listed below as examples of preferred configurations that adopt the above preferable configurations as appropriate.

An imaging lens according to a first aspect substantially consists of: a first lens group G1 having a negative refractive power as a whole; a second lens group G2 having a positive refractive power as a whole; an aperture stop; a third lens group G3 having a positive refractive power as a whole; and a fourth lens group G4 having a negative refractive power as a whole; provided in this order from the object side. The first lens group G1 substantially consists only of two or more negative lenses, the second lens group G2 has a positive lens at the most object side thereof; the third lens group G3 has three positive lenses and a negative lens having a concave surface toward the object side at the most object side thereof; and the fourth lens group G4 substantially consists only of a single negative lens. The fourth lens group G4 moves from the object side to the image side when changing focus from an object at infinity to an object at an extremely close distance, and only the fourth lens group G4 moves during focusing operations.

An imaging lens according to a second aspect substantially consists of: a first lens group G1 having a negative refractive power as a whole; a second lens group G2 having a positive refractive power as a whole; an aperture stop; a third lens group G3 having a positive refractive power as a whole; and a fourth lens group G4 having a negative refractive power as a whole; provided in this order from an object side. The first lens group G1 substantially consists only of two or more negative lenses and the lens surface most toward the object side within the first lens group G1 is convex. The second lens group G2 has a positive lens at the most object side thereof, and the number of positive lenses within the second lens group is two. The third lens group G3 has a negative lens with a concave surface toward the object side at the most object side thereof. The fourth lens group substantially consists only of a single negative lens, and the fourth lens group G4 moves from the object side to an image side when changing focus from an object at infinity to an object at an extremely close distance, and only the fourth lens group G4 moves during focusing operations.

An imaging lens according to a third aspect substantially consists of: a first lens group G1 having a negative refractive power as a whole; a second lens group G2 having a positive refractive power as a whole; an aperture stop; a third lens group G3 having a positive refractive power as a whole; and a fourth lens group G4 having a negative refractive power as a whole, provided in this order from an object side. The first lens group G1 substantially consists only of two or more negative lenses. The second lens group G2 has a positive lens at the most object side thereof, and the number of positive lenses within the second lens group G2 is two. The third lens group G3 has a negative lens with a concave surface toward the object side at the most object side thereof. The fourth lens group G4 substantially consists only of a single negative lens, the fourth lens group G4 moves from the object side to an image side when changing focus from an object at infinity to an object at an extremely close distance, and only the fourth lens group G4 moves during focusing operations. The imaging lens satisfies Conditional Formula (1).

Note that the imaging lenses of the first through third aspects may selectively have the aforementioned preferable configurations. In addition, FIG. 1 illustrates an example in which the optical member PP is provided between the lens system and the image formation plane Sim. Alternatively, various filters may be provided among each of the lenses. As a further alternative, coatings that have the same functions as the various filters may be administered on the surfaces of the lenses.

The embodiment of the present disclosure described above may be applied to an imaging lens having a full angle of view greater than 80 degrees. In addition, the embodiment of the present disclosure described above may be applied to an imaging lens having an F number less than 1.9.

Next, examples of numerical values of the imaging lens of the present disclosure will be described.

EXAMPLE 1

The imaging lens of Example 1 is of the configuration illustrated in the cross sectional diagram of FIG. 1. The manner in which the imaging lens is illustrated has been described above, and redundant descriptions will be omitted here. Table 1, Table 2, and Table 3 respectively show basic lens data, items related to the d line, and aspherical surface coefficients of the imaging lens of Example 1.

In the basic lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, the distances between an ith surface and an i+1 st surface along the optical axis Z are shown in the column Di. The refractive indices of jth (j=1, 2, 3, . . . ) constituent elements that sequentially increase from the object side to the image side, with the lens at the most object side designated as first, with respect to the d line (wavelength: 587.56 nm) are shown in the column Ndj. The Abbe's numbers of the jth constituent element with respect to the d line are shown in the column vdj.

Note that the aperture stop St and the optical member PP is also included in the table that shows basic lens data. "St" is shown along with the surface number of the surface that corresponds to the aperture stop St. The signs of the radii of curvature are positive in cases that the surface shape is convex toward the object side, and negative in cases that the surface shape is convex toward the image side. The value in the lowermost row of column Di is the distance between the optical member PP and the image formation plane Sim.

Table 2 shows values of the focal length f, the back focus Bf, the F number (FNo.), and the full angle of view 2ω (in units of degrees). The values in the table that shows the various items are related to the d line.

In the lens data of Table 1, surface numbers of aspherical surfaces are denoted with the mark "*", and radii of curvature of paraxial regions are shown as the radii of curvature of the aspherical surfaces. Table 3 shows the aspherical surface coefficients of these aspherical surfaces. In the numerical values of the aspherical surface data of Table 3, "E-n (n: integer)" means "·10$^{-n}$". Note that the aspherical surface coefficients are the values of the coefficients KA and Am (m=4, 6, 8, . . . 20) in the following aspherical surface formula:

$$Zd = \frac{C \times h^2}{1 + \sqrt{1 - KA \times C^2 \times h^2}} + \sum_m Am \times h^m \quad \text{[Formula 1]}$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Am are aspherical surface coefficients (m=4, 6, 8, . . . 20).

In each of the tables below, degrees are used as units of angles, and mm are used as the units for lengths. However, it is possible for optical systems to be proportionately enlarged or proportionately reduced and utilized. Therefore, other appropriate units may be used. In addition, the tables below show numerical values which are rounded off at a predetermined number of digits.

TABLE 1

Example 1 Basic Lens Data

| Si | Ri | Di | Ndj | vdj |
|---|---|---|---|---|
| 1 | 46.39198 | 1.400 | 1.58913 | 61.13 |
| 2 | 15.90897 | 6.000 | | |
| *3 | 23.52931 | 1.500 | 1.51633 | 64.06 |
| *4 | 11.90000 | 19.063 | | |
| 5 | 29.26297 | 2.677 | 1.92286 | 20.88 |
| 6 | 66.29971 | 1.000 | | |
| 7 | 38.76689 | 4.500 | 1.43700 | 95.10 |
| 8 | −38.76689 | 2.000 | | |
| 9(St) | ∞ | 5.284 | | |
| 10 | −21.45554 | 1.310 | 1.72825 | 28.46 |
| 11 | 21.45554 | 6.500 | 1.43700 | 95.10 |
| 12 | −21.45554 | 0.150 | | |
| 13 | 24.69621 | 3.700 | 1.43700 | 95.10 |
| 14 | ∞ | 0.190 | | |
| *15 | 85.61695 | 4.000 | 1.69350 | 53.18 |
| *16 | −28.58745 | 1.000 | | |
| 17 | 33.60766 | 1.200 | 1.48749 | 70.44 |
| 18 | 15.86058 | 22.567 | | |
| 19 | ∞ | 2.500 | 1.51680 | 64.20 |
| 20 | ∞ | 2.994 | | |

TABLE 2

Example 1 Items Related to d Line

| | |
|---|---|
| f | 16.439 |
| Bf | 27.209 |
| FNo. | 1.85 |
| 2ω[°] | 83.0 |

Example 1 Aspherical Surface Coefficients

| Surface Number | 3 | 4 | 15 | 16 |
|---|---|---|---|---|
| KA | 1.0000000E+00 | 1.0000000E+00 | 1.0000000E+00 | 1.0000000E+00 |
| A4 | 7.2499585E−05 | 3.9500628E−05 | −4.4454184E−05 | −9.1899597E−06 |
| A6 | −5.2247782E−07 | −7.1471212E−07 | −2.1645349E−07 | −3.0060319E−07 |
| A8 | 7.5827736E−10 | 4.4775307E−09 | 9.0651536E−09 | 5.2556710E−09 |
| A10 | 2.9424859E−11 | −3.4821755E−10 | −6.1076738E−10 | −1.1575165E−10 |
| A12 | −1.2641359E−13 | 8.9449453E−12 | 1.9547294E−11 | 9.0109921E−13 |
| A14 | −6.4168218E−16 | −9.7562072E−14 | −3.6065082E−13 | −6.0438657E−16 |
| A16 | −9.9236488E−19 | 3.5641856E−16 | 3.8208114E−15 | −7.2238154E−18 |
| A18 | 6.4223843E−20 | 1.0126022E−18 | −2.1646228E−17 | −3.2135033E−19 |
| A20 | −2.2366638E−22 | −7.8646768E−21 | 5.0478904E−20 | 1.9706116E−21 |

Figure 7:
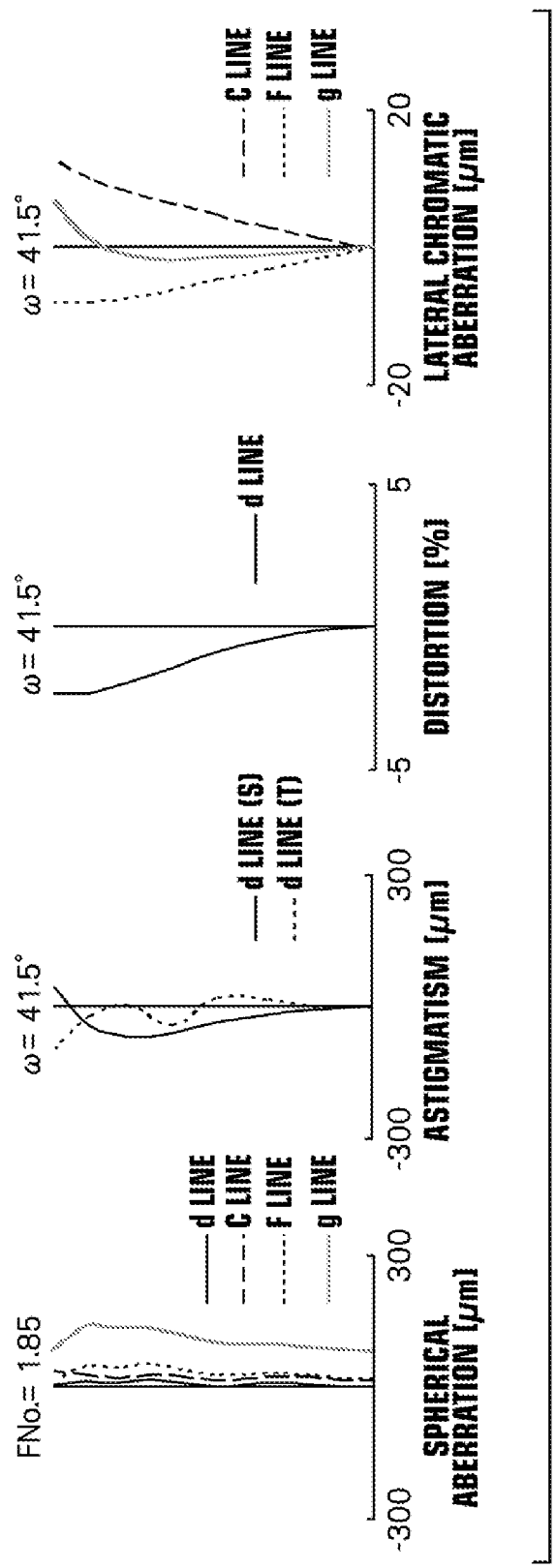
FIG. 7 is a collection of diagrams that illustrate various aberrations of the imaging lens according to Example 1, which are spherical aberration, astigmatism, distortion, and lateral chromatic aberration in this order from the left side of the drawing sheet.

A spherical aberration diagram, an astigmatism diagram, a distortion diagram, and a lateral chromatic aberration diagram of the imaging lens of Example 1 in the case that the object distance is infinity are shown in this order from the left side of the drawing sheet in FIG. 7. The spherical aberration diagram shows aberrations related to the d line (wavelength: 587.6 nm), the C line (wavelength: 656.3 nm), the F line (wavelength: 486.1 nm), and the g line (wavelength: 435.8 nm) as a black solid line, a long broken line, a short broken line, and a gray solid line, respectively. In the astigmatism diagram, aberrations in the sagittal direction are indicated by solid lines, while aberrations in the tangential direction are indicated by short broken lines. In the distortion diagram, aberrations related to the d line are shown as a solid line. In the lateral chromatic diagrams, aberrations related to the C line, the F line, and the g line are shown as a long broken line, a short broken line, and a gray solid line, respectively. In the diagram that illustrates spherical aberrations, "FNo." denotes F numbers. In the other diagrams that illustrate the aberrations, ω denotes half angles of view.

The symbols, the meanings, and the manner in which the data are shown in the diagrams related to Example 1 above are the same for the following Examples to be described later, unless particularly noted.

EXAMPLE 2

The imaging lens of Example 2 is of the configuration illustrated in the cross sectional diagram of FIG. 2. Basic lens data, items related to the d line, and aspherical surface coefficients of the imaging lens of Example 2 are shown in Table 4, Table 5, and Table 6, respectively. A spherical aberration diagram, an astigmatism diagram, a distortion diagram, and a lateral chromatic aberration diagram of the imaging lens of Example 2 in the case that the object distance is infinity are shown in this order from the left side of the drawing sheet in FIG. 8.

TABLE 4

Example 2 Basic Lens Data

| Si | Ri | Di | Ndj | vdj |
|---|---|---|---|---|
| 1 | 35.79900 | 1.323 | 1.59282 | 68.62 |
| 2 | 15.61105 | 3.416 | | |
| 3 | 20.39300 | 1.300 | 1.48749 | 70.40 |
| *4 | 12.27578 | 4.263 | | |
| 5 | 28.64975 | 1.300 | 1.59282 | 68.62 |
| 6 | 17.25869 | 12.261 | | |
| 7 | 24.54423 | 2.671 | 1.75550 | 25.07 |
| 8 | 67.15651 | 2.731 | | |

TABLE 4-continued

Example 2 Basic Lens Data

| Si | Ri | Di | Ndj | vdj |
|---|---|---|---|---|
| 9 | 45.44696 | 5.149 | 1.51118 | 51.02 |
| 10 | −17.58491 | 1.300 | 1.72151 | 29.24 |
| 11 | −26.19720 | 4.537 | | |
| 12(St) | ∞ | 2.622 | | |
| *13 | −22.57627 | 1.300 | 1.84400 | 24.80 |
| 14 | 40.50564 | 2.002 | | |
| 15 | 46.91423 | 3.799 | 1.55332 | 71.68 |
| 16 | −35.24937 | 0.150 | | |
| 17 | 60.91254 | 4.484 | 1.59282 | 68.62 |
| 18 | −24.43053 | 0.150 | | |
| 19 | 2571.19420 | 2.579 | 1.67000 | 51.63 |

TABLE 4-continued

Example 2 Basic Lens Data

| Si | Ri | Di | Ndj | vdj |
|---|---|---|---|---|
| *20 | −40.12451 | 1.000 | | |
| 21 | 30.94660 | 1.300 | 1.49831 | 65.13 |
| 22 | 15.86706 | 22.363 | | |
| 23 | ∞ | 2.500 | 1.51680 | 64.20 |
| 24 | ∞ | 2.977 | | |

TABLE 5

Example 2 Items Related to d Line

| f | 16.423 |
|---|---|
| Bf | 26.989 |
| FNo. | 1.85 |
| 2ω[°] | 82.8 |

TABLE 6

Example 2 Aspherical Surface Coefficients

| Surface Number | 4 | 13 | 20 |
|---|---|---|---|
| KA | 1.0000000E+00 | 1.0000000E+00 | 1.0000000E+00 |
| A4 | −3.4017685E−05 | −5.0368411E−05 | 1.9111821E−05 |
| A6 | −5.3255848E−07 | 4.3623153E−08 | −7.2960680E−08 |
| A8 | 1.6413159E−08 | −9.7382105E−10 | 2.5253312E−09 |
| A10 | −5.0887809E−10 | 3.7464172E−12 | −2.5561932E−11 |
| A12 | 8.3663060E−12 | 0.0000000E+00 | 5.3347742E−14 |
| A14 | −8.0975816E−14 | 0.0000000E+00 | 8.5054372E−16 |
| A16 | 4.2913217E−16 | 0.0000000E+00 | −4.6063377E−19 |
| A18 | −1.0579084E−18 | 0.0000000E+00 | −5.3303590E−20 |
| A20 | 5.0318999E−22 | 0.0000000E+00 | 1.9371533E−22 |

EXAMPLE 3

The imaging lens of Example 3 is of the configuration illustrated in the cross sectional diagram of FIG. 3. Basic lens data, items related to the d line, and aspherical surface coefficients of the imaging lens of Example 3 are shown in Table 7, Table 8, and Table 9, respectively. A spherical aberration diagram, an astigmatism diagram, a distortion diagram, and a lateral chromatic aberration diagram of the imaging lens of Example 3 in the case that the object distance is infinity are shown in this order from the left side of the drawing sheet in FIG. 9.

TABLE 7

Example 3 Basic Lens Data

| Si | Ri | Di | Ndj | vdj |
|---|---|---|---|---|
| 1 | 32.32311 | 1.300 | 1.59282 | 68.62 |
| 2 | 15.40457 | 4.177 | | |
| 3 | 20.80285 | 1.300 | 1.50670 | 70.54 |
| *4 | 12.66419 | 4.641 | | |
| 5 | 17.93482 | 1.300 | 1.59282 | 68.62 |
| 6 | 13.12611 | 12.011 | | |
| 7 | 39.01085 | 2.549 | 1.84139 | 24.56 |
| 8 | 811.62123 | 3.916 | | |
| 9 | 31.34519 | 4.566 | 1.49700 | 81.61 |
| 10 | −27.06072 | 0.150 | | |
| 11 | 272.07135 | 1.300 | 1.71300 | 53.94 |
| 12 | 36.89380 | 2.343 | | |
| 13(St) | ∞ | 3.426 | | |
| 14 | −15.85819 | 1.300 | 1.68893 | 31.16 |
| 15 | 28.46829 | 4.922 | 1.43875 | 94.94 |

TABLE 7-continued

Example 3 Basic Lens Data

| Si | Ri | Di | Ndj | vdj |
|---|---|---|---|---|
| 16 | −22.22051 | 0.275 | | |
| 17 | 30.71096 | 4.966 | 1.55332 | 71.68 |
| 18 | −28.25748 | 0.150 | | |
| 19 | 68.26526 | 2.555 | 1.67000 | 51.63 |
| *20 | −82.72755 | 1.000 | | |
| 21 | 28.51280 | 1.300 | 1.49831 | 65.13 |
| 22 | 17.19427 | 22.553 | | |
| 23 | ∞ | 2.500 | 1.51680 | 64.20 |
| 24 | ∞ | 3.002 | | |

TABLE 8

Example 3 Items Related to d Line

| f | 16.424 |
|---|---|
| Bf | 27.203 |
| FNo. | 1.85 |
| 2ω[°] | 82.8 |

TABLE 9

Example 3 Aspherical Surface Coefficients

| Surface Number | 4 | 20 |
|---|---|---|
| KA | 1.0000000E+00 | 1.0000000E+00 |
| A4 | −4.1271169E−05 | 3.3353055E−05 |
| A6 | −1.7556504E−07 | −3.0710009E−07 |
| A8 | 8.8288331E−09 | 8.7384912E−09 |
| A10 | −4.4181124E−10 | −1.1678230E−10 |
| A12 | 8.3803198E−12 | 5.0644025E−13 |
| A14 | −8.3566891E−14 | 3.5530293E−15 |
| A16 | 4.2454880E−16 | −1.6294666E−17 |
| A18 | −8.9623284E−19 | −3.0349552E−19 |
| A20 | 7.3889173E−23 | 1.7206516E−21 |

EXAMPLE 4

Figure 4:
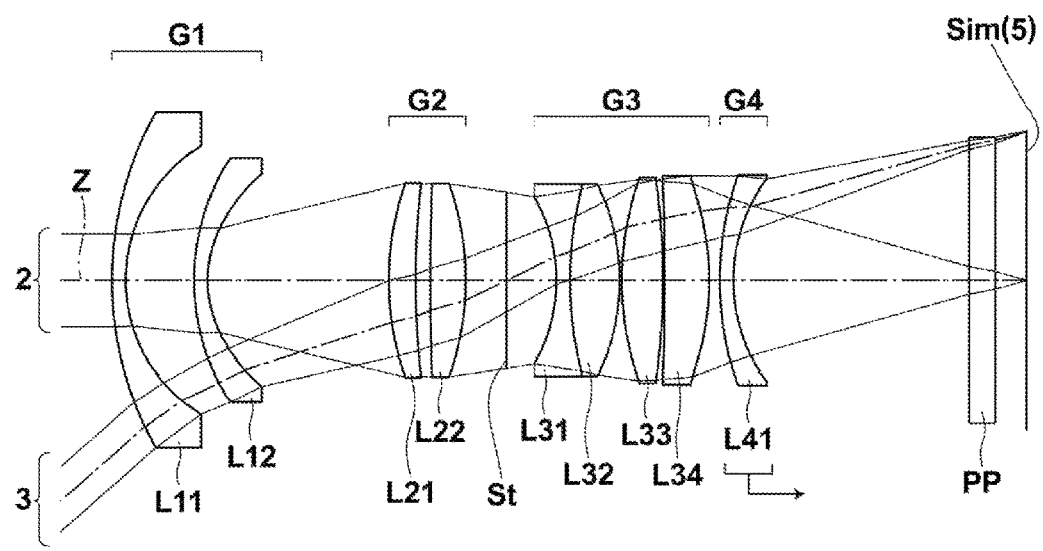
FIG. 4 is a sectional diagram that illustrates the lens configuration of a imaging lens according to Example 4 of the present disclosure and the paths of rays of light.

The imaging lens of Example 4 is of the configuration illustrated in the cross sectional diagram of FIG. 4. Basic lens data, items related to the d line, and aspherical surface coefficients of the imaging lens of Example 4 are shown in Table 10, Table 11, and Table 12, respectively. A spherical aberration diagram, an astigmatism diagram, a distortion diagram, and a lateral chromatic aberration diagram of the imaging lens of Example 4 in the case that the object distance is infinity are shown in this order from the left side of the drawing sheet in FIG. 10.

TABLE 10

Example 4 Basic Lens Data

| Si | Ri | Di | Ndj | vdj |
|---|---|---|---|---|
| 1 | 32.92661 | 1.300 | 1.59282 | 68.62 |
| 2 | 15.03597 | 6.527 | | |
| 3 | 21.43706 | 1.300 | 1.51760 | 63.54 |
| *4 | 11.02196 | 17.357 | | |
| 5 | 28.1579 | 22.566 | 1.84139 | 24.56 |
| 6 | 83.47019 | 1.390 | | |
| 7 | 227.41607 | 3.376 | 1.43875 | 94.94 |
| 8 | −27.58918 | 3.913 | | |
| 9(St) | ∞ | 4.820 | | |
| 10 | −15.87582 | 1.300 | 1.72825 | 28.32 |
| 11 | 36.00102 | 4.739 | 1.43875 | 94.94 |

TABLE 10-continued

Example 4 Basic Lens Data

| Si | Ri | Di | Ndj | vdj |
|---|---|---|---|---|
| 12 | −20.68064 | 0.202 | | |
| 13 | 29.47083 | 3.933 | 1.59282 | 68.62 |
| 14 | −66.62646 | 0.150 | | |
| *15 | −966.68981 | 4.262 | 1.69350 | 53.18 |
| *16 | −25.13432 | 1.000 | | |
| 17 | 29.82353 | 1.300 | 1.48749 | 70.24 |
| 18 | 16.40402 | 22.567 | | |
| 19 | ∞ | 2.500 | 1.51680 | 64.20 |
| 20 | ∞ | 2.972 | | |

TABLE 11

Example 4 Items Related to d Line

| | |
|---|---|
| f | 16.420 |
| Bf | 27.188 |
| FNo. | 1.85 |
| 2ω[°] | 82.8 |

TABLE 12

Example 4 Aspherical Surface Coefficients

| Surface Number | 4 | 15 | 16 |
|---|---|---|---|
| KA | 1.0000000E+00 | 1.0000000E+00 | 1.0000000E+00 |
| A4 | −5.2654444E−05 | −3.0072071E−05 | 1.2984646E−05 |
| A6 | −6.5276335E−08 | 1.4322479E−07 | −6.9421833E−08 |
| A8 | −3.4243810E−09 | −1.7383712E−09 | 5.9379388E−09 |
| A10 | −2.7130395E−10 | 7.7411494E−11 | −1.0556646E−10 |
| A12 | 8.4166194E−12 | −1.4339528E−12 | 9.9889047E−13 |
| A14 | −1.0600303E−13 | 1.1195691E−14 | −1.6707731E−15 |
| A16 | 4.1196394E−16 | 2.5151114E−17 | −4.0556387E−17 |
| A18 | 1.9448220E−18 | −8.4209064E−19 | 2.8995906E−19 |
| A20 | −1.5790803E−20 | 3.3614557E−21 | −5.4008922E−22 |

TABLE 13

Example 5 Basic Lens Data

| Si | Ri | Di | Ndj | vdj |
|---|---|---|---|---|
| 1 | 24.81991 | 1.300 | 1.59282 | 68.62 |
| 2 | 14.56143 | 6.071 | | |
| *3 | 32.33422 | 1.300 | 1.51633 | 64.06 |
| *4 | 11.63763 | 19.486 | | |
| 5 | 30.53515 | 2.775 | 1.84666 | 23.78 |
| 6 | 95.09411 | 1.557 | | |
| 7 | 65.04050 | 3.845 | 1.43700 | 95.10 |
| 8 | −32.93710 | 2.000 | | |
| 9(St) | ∞ | 5.127 | | |
| 10 | −20.19167 | 1.300 | 1.71736 | 29.50 |
| 11 | 24.36111 | 5.030 | 1.43700 | 95.10 |
| 12 | −27.76010 | 0.150 | | |
| 13 | 26.85919 | 4.562 | 1.59282 | 68.62 |
| 14 | −49.34513 | 0.150 | | |
| *15 | 234.61037 | 2.949 | 1.69350 | 53.18 |
| *16 | −34.32621 | 1.000 | | |
| 17 | 30.62430 | 1.300 | 1.58913 | 61.25 |
| 18 | 16.15025 | 22.098 | | |
| 19 | ∞ | 2.500 | 1.51680 | 64.20 |
| 20 | ∞ | 2.988 | | |

TABLE 14

Example 5 Items Related to d Line

| | |
|---|---|
| f | 16.431 |
| Bf | 26.734 |
| FNo. | 1.85 |
| 2ω[°] | 82.8 |

TABLE 15

Example 5 Aspherical Surface Coefficients

| Surface Number | 3 | 4 | 15 | 16 |
|---|---|---|---|---|
| KA | 1.0000000E+00 | 1.0000000E+00 | 1.0000000E+00 | 1.0000000E+00 |
| A4 | 2.8389812E−05 | −1.3466132E−05 | −2.9436571E−05 | 9.7735810E−06 |
| A6 | −4.2128009E−07 | −4.1060531E−07 | −5.0529376E−08 | −1.4023466E−07 |
| A8 | 2.6630661E−09 | 9.9723366E−11 | 1.4723991E−08 | 1.0397086E−08 |
| A10 | 1.9679350E−12 | −3.0213110E−10 | −6.4624959E−10 | −1.6212833E−10 |
| A12 | −7.6121466E−14 | 8.8140831E−12 | 1.9315506E−11 | 1.1995798E−12 |
| A14 | −2.2786345E−16 | −1.0302804E−13 | −3.5516639E−13 | 3.8159740E−16 |
| A16 | 1.8895889E−18 | 3.6740940E−16 | 3.8618706E−15 | −2.7646707E−17 |
| A18 | 1.6589676E−20 | 1.5494449E−18 | −2.2599932E−17 | −1.5337859E−19 |
| A20 | −8.2512638E−23 | −1.0799365E−20 | 5.4775753E−20 | 1.5205826E−21 |

EXAMPLE 5

Figure 5:
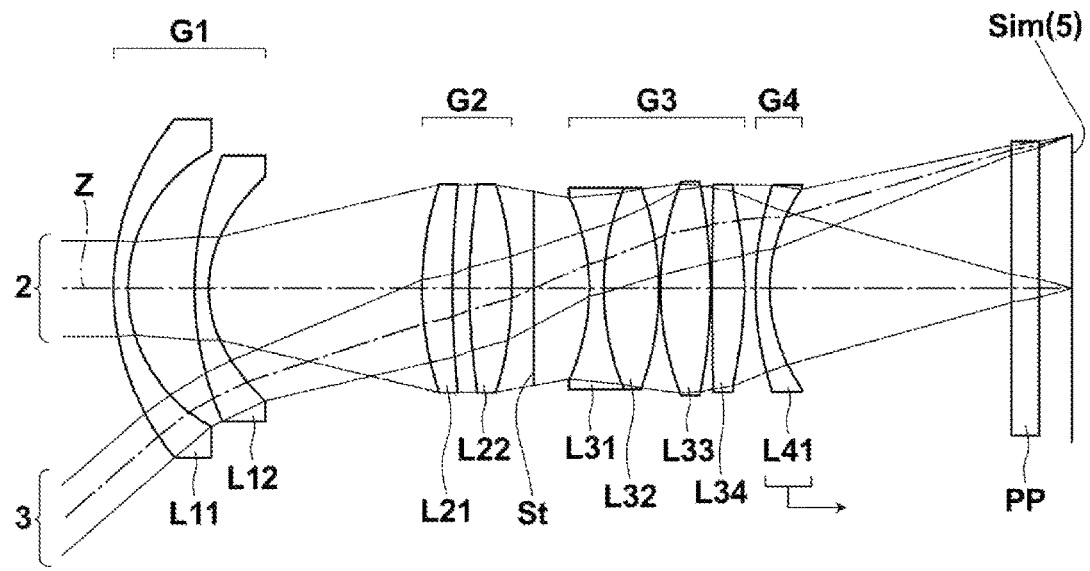
FIG. 5 is a sectional diagram that illustrates the lens configuration of a imaging lens according to Example 5 of the present disclosure and the paths of rays of light.

The imaging lens of Example 5 is of the configuration illustrated in the cross sectional diagram of FIG. 5. Basic lens data, items related to the d line, and aspherical surface coefficients of the imaging lens of Example 5 are shown in Table 13, Table 14, and Table 15, respectively. A spherical aberration diagram, an astigmatism diagram, a distortion diagram, and a lateral chromatic aberration diagram of the imaging lens of Example 5 in the case that the object distance is infinity are shown in this order from the left side of the drawing sheet in FIG. 11.

EXAMPLE 6

Figure 6:
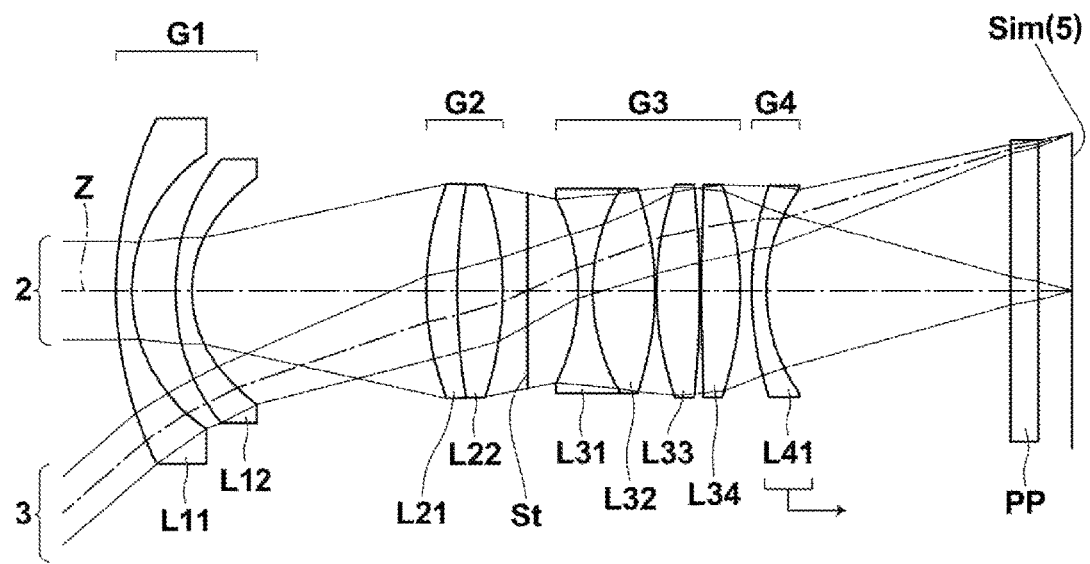
FIG. 6 is a sectional diagram that illustrates the lens configuration of a imaging lens according to Example 6 of the present disclosure and the paths of rays of light.

The imaging lens of Example 6 is of the configuration illustrated in the cross sectional diagram of FIG. 6. Basic lens data, items related to the d line, and aspherical surface coefficients of the imaging lens of Example 6 are shown in Table 16, Table 17, and Table 18, respectively. A spherical aberration diagram, an astigmatism diagram, a distortion diagram, and a lateral chromatic aberration diagram of the imaging lens of Example 6 in the case that the object distance is infinity are shown in this order from the left side of the drawing sheet in FIG. 12.

TABLE 16

Example 6 Basic Lens Data

| Si | Ri | Di | Ndj | vdj |
|---|---|---|---|---|
| 1 | 35.54278 | 1.400 | 1.59282 | 68.62 |
| 2 | 15.00000 | 3.885 | | |
| *3 | 23.97551 | 1.449 | 1.43875 | 94.94 |
| *4 | 11.50548 | 20.842 | | |
| 5 | 26.80074 | 2.737 | 1.80809 | 22.76 |
| 6 | 59.97779 | 4.046 | 1.43700 | 95.10 |
| 7 | −29.64569 | 2.189 | | |
| 8(St) | ∞ | 4.549 | | |
| 9 | −18.61586 | 1.300 | 1.68893 | 31.16 |
| 10 | 18.61586 | 5.506 | 1.49700 | 81.61 |
| 11 | −28.08973 | 0.163 | | |
| 12 | 28.88723 | 3.813 | 1.55332 | 71.68 |
| 13 | −97.45766 | 0.150 | | |
| *14 | 122.38861 | 3.464 | 1.67790 | 54.89 |
| *15 | −27.79797 | 1.000 | | |
| 16 | 30.34694 | 1.300 | 1.58913 | 61.25 |
| 17 | 16.04876 | 21.706 | | |
| 18 | ∞ | 2.500 | 1.51680 | 64.20 |
| 19 | ∞ | 2.960 | | |

TABLE 17

Example 6 Items Related to d Line

| | |
|---|---|
| f | 16.430 |
| Bf | 26.314 |
| FNo. | 1.85 |
| 2ω[°] | 82.8 |

TABLE 18

Example 6 Aspherical Surface Coefficients

| Surface Number | 3 | 4 | 14 | 15 |
|---|---|---|---|---|
| KA | 1.0000000E+00 | 1.0000000E+00 | 1.0000000E+00 | 1.0000000E+00 |
| A4 | 1.0400164E−04 | 7.9454147E−05 | −3.3922803E−05 | 1.0081507E−05 |
| A6 | −9.0476901E−07 | −1.1298350E−06 | 2.1901468E−09 | −2.9741676E−07 |
| A8 | 3.9082158E−09 | 7.1593164E−09 | 1.1470998E−08 | 1.0283021E−08 |
| A10 | 3.1061581E−12 | −3.4240628E−10 | −7.6059398E−10 | −1.5286970E−10 |
| A12 | −5.4728707E−14 | 7.7731356E−12 | 2.6246470E−11 | 8.8540216E−13 |
| A14 | −1.9783940E−16 | −8.9298218E−14 | −5.1191782E−13 | 1.0736750E−15 |
| A16 | 1.0334147E−18 | 4.7779905E−16 | 5.6865629E−15 | 4.6492192E−18 |
| A18 | 9.6795547E−21 | −7.1504662E−19 | −3.3481402E−17 | −4.4318522E−19 |
| A20 | −4.1306684E−23 | −2.2785618E−21 | 8.1214649E−20 | 2.2293327E−21 |

Table 19 shows values corresponding to Conditional Formulae (1) through (7), the focal length f of the entire system, the focal length f1 of the first lens group G1, the focal length f2 of the second lens group G2, the focal length f3 of the third lens group G3, and the focal length f4 of the fourth lens group G4 of the imaging lenses of Examples 1 through 6. The values shown in Table 19 are related to the d line.

TABLE 19

| Formula | | Example 1 | Example 2 | Example 3 | Example 4 | Example 5 | Example 6 |
|---|---|---|---|---|---|---|---|
| (1) | vdG2P1 − vdG2P2 | −74.22 | −25.95 | −57.05 | −70.38 | −71.32 | −72.34 |
| (2) | f/f1 | −0.792 | −0.893 | −0.834 | −0.758 | −0.766 | −0.717 |
| (3) | f/f2 | 0.631 | 0.692 | 0.605 | 0.591 | 0.605 | 0.613 |
| (4) | f/f3 | 0.646 | 0.650 | 0.650 | 0.649 | 0.650 | 0.650 |
| (5) | f/f4 | −0.261 | −0.244 | −0.182 | −0.213 | −0.274 | −0.275 |
| (6) | f · tanω/RL | 0.917 | 0.913 | 0.842 | 0.882 | 0.897 | 0.903 |
| (7) | DG12/F | 1.160 | 0.747 | 0.731 | 1.057 | 1.186 | 1.269 |
| | f | 16.439 | 16.423 | 16.424 | 16.420 | 16.431 | 16.430 |
| | f1 | −20.764 | −18.390 | −19.704 | −21.656 | −21.460 | −22.923 |
| | f2 | 26.072 | 23.736 | 27.143 | 27.787 | 27.138 | 26.803 |
| | f3 | 25.454 | 25.267 | 25.267 | 25.283 | 25.277 | 25.278 |
| | f4 | −63.008 | −67.275 | −90.375 | −77.236 | −60.000 | −59.835 |

As can be understood from the above data, the imaging lenses of Examples 1 through 6 have small F numbers of 1.85 and wide full angles of view of 83 degrees. The focusing lens group of each of the imaging lenses of Examples 1 through 6 is constituted by a single lens, and the weight of the focusing lens group is reduced. Various aberrations are favorably corrected, and the imaging lenses of Examples 1 through 6 have high optical performance.

Figure 13A:
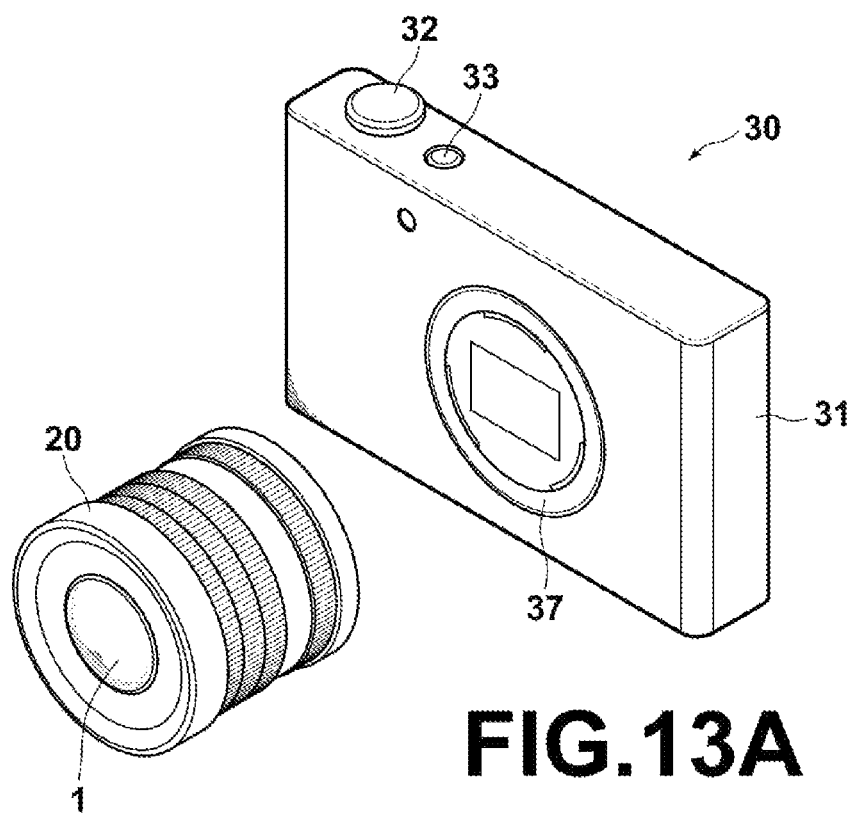
FIG. 13A is a perspective view that illustrates the front side of an imaging apparatus according to an embodiment of the present disclosure.
Figure 13B:
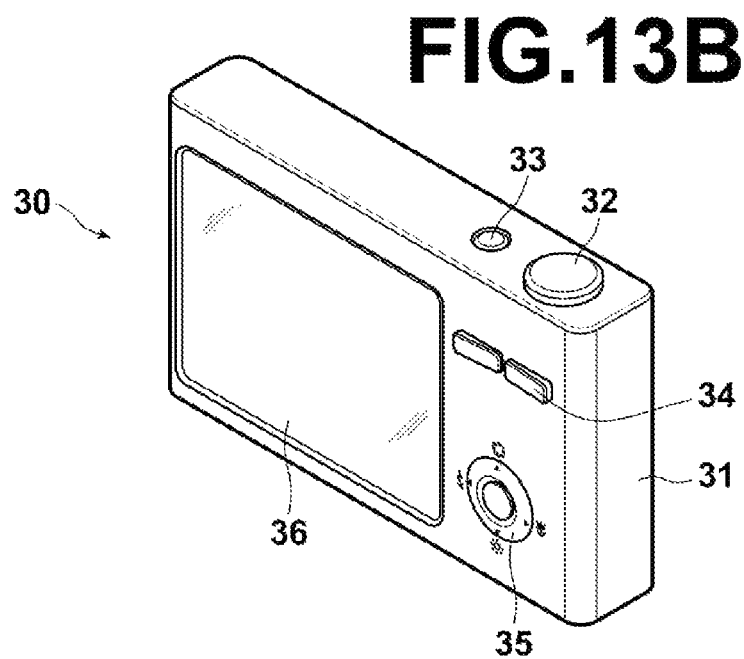
FIG. 13B is a perspective view that illustrates the rear side of an imaging apparatus according to an embodiment of the present disclosure.

Next, an imaging apparatus according to an embodiment of the present disclosure will be described. FIG. 13A and FIG. 13B illustrate the outer appearance of a camera 30 according to an embodiment of the present disclosure. FIG. 13A is a perspective view of the camera 30 as viewed from the front, and FIG. 13B is a perspective view of the camera 30 as viewed from the rear. The camera 30 is a single lens digital camera without a reflex finder, onto which an exchangeable lens 20 is interchangeably mounted.

The camera 30 is equipped with a camera body 31. A shutter release button 32 and a power button 33 are provided on the upper surface of the camera body 31. Operating sections 34 and 35 and a display section 36 are provided on the rear surface of the camera body 31. The display section 36 displays images which have been photographed and images within the angle of view prior to photography.

A photography opening, in to which light from targets of photography enters, is provided at the central portion of the front surface of the camera body 31. A mount 37 is provided at a position corresponding to the photography opening. The exchangeable lens 20 is mounted onto the camera body 31 via the mount 37. The exchangeable lens 20 is the imaging lens 1 according to the embodiment of the present disclosure housed in a lens barrel.

An imaging element (not shown), such as a CCD that receives images of subjects formed by the exchangeable lens 20 and outputs image signals corresponding to the images, a signal processing circuit that processes the image signals output by the imaging element to generate images, and a recording medium for recording the generated images, are provided within the camera body 31. In this camera 30, photography of a still image corresponding to a single frame is enabled by pressing the shutter release button 32. Image data obtained by photography or video imaging are recorded in the recording medium.

The present disclosure has been described with reference to the embodiments and Examples thereof. However, the present disclosure is not limited to the embodiments and Examples described above, and various modifications are possible. For example, the values of the radii of curvature, the distances among surfaces, the refractive indices, the Abbe's numbers, the aspherical surface coefficients of each lens, etc., are not limited to the numerical values indicated in connection with the Examples, and may be other values.

In addition, a single lens digital camera without a reflex finder was described as an example of the embodiment of the imaging apparatus. However, the imaging apparatus of the present disclosure is not limited to such a camera. The present disclosure may be applied to imaging apparatuses such as single lens reflex cameras, film cameras, and video cameras as well, for example.

What is claimed is:

1. An imaging lens consisting of, in order from the object side to the image side:
a first lens group having a negative refractive power as a whole;
a second lens group having a positive refractive power as a whole;
an aperture stop;
a third lens group having a positive refractive power as a whole; and
a fourth lens group having a negative refractive power as a whole;
the first lens group consisting only of two or more negative lenses;
the second lens group having a positive lens at the most object side thereof;
the third lens group having three positive lenses and a negative lens having a concave surface toward the object side at the most object side thereof;
the fourth lens group consisting only of a single negative lens, the fourth lens group moving from the object side to an image side when changing focus from an object at infinity to an object at an extremely close distance; and
only the fourth lens group moving during focusing operations.

2. An imaging lens as defined in claim 1, wherein:
the lens most toward the object side within the first lens group is a meniscus lens having a convex surface toward the object side.

3. An imaging lens as defined in claim 1, wherein:
the second lens group has two positive lenses; and
Conditional Formula (1) below is satisfied:

$$-90 < vdG2P1 - vdG2P2 < -15 \qquad (1)$$

wherein vdG2P1 is the Abbe's number of the positive lens most toward the object side within the second lens group with respect to the d line, and vdG2P2 is the Abbe's number of the second positive lens from the object side within the second lens group with respect to the d line.

4. An imaging lens as defined in claim 2, wherein:
the second lens group has two positive lenses; and
Conditional Formula (1) below is satisfied:

$$-90 < vdG2P1 - vdG2P2 < -15 \qquad (1)$$

wherein vdG2P1 is the Abbe's number of the positive lens most toward the object side within the second lens group with respect to the d line, and vdG2P2 is the Abbe's number of the second positive lens from the object side within the second lens group with respect to the d line.

5. An imaging lens as defined in claim 1, wherein:
the negative lens within the fourth lens group is a meniscus lens having a concave surface toward the image side.

6. An imaging lens as defined in claim 1 that satisfies Conditional Formula (2) below:

$$-1 < f/f1 < -0.6 \qquad (2)$$

wherein f is the focal length of the entire system, and f1 is the focal length of the first lens group.

7. An imaging lens as defined in claim 1 that satisfies Conditional Formula (3) below:

$$0.4 < f/f2 < 0.8 \qquad (3)$$

wherein f is the focal length of the entire system, and f2 is the focal length of the second lens group.

8. An imaging lens as defined in claim 1 that satisfies Conditional Formula (4) below:

$$0.4 < f/f3 < 0.8 \qquad (4)$$

wherein f is the focal length of the entire system, and f3 is the focal length of the third lens group.

9. An imaging lens as defined in claim 1 that satisfies Conditional Formula (5) below:

$$-0.4<f/f4<-0.1 \quad (5)$$

wherein f is the focal length of the entire system, and f4 is the focal length of the fourth lens group.

10. An imaging lens as defined in claim 1 that satisfies Conditional Formula (6) below:

$$0.4<f\cdot\tan\omega/RL<1.5 \quad (6)$$

wherein f is the focal length of the entire system, ω is the half angle of view, and RL is the paraxial radius of curvature of the lens surface most toward the image side.

11. An imaging lens as defined in claim 1 that satisfies Conditional Formula (7) below:

$$0.6<DG12/f<1.8 \quad (7)$$

wherein DG12 is the distance between the first lens group and the second lens group along the optical axis, and f is the focal length of the entire system.

12. An imaging lens as defined in claim 1, wherein:
the first lens is constituted only by one of two and three negative lenses.

13. An imaging lens as defined in claim 1, wherein the second lens group has two positive lenses, and Conditional Formula (1-1) below is satisfied:

$$-80<vdG2P1-vdG2P2<-20 \quad (1\text{-}1)$$

wherein vdG2P1 is the Abbe's number of the positive lens most toward the object side within the second lens group with respect to the d line, and vdG2P2 is the Abbe's number of the second positive lens from the object side within the second lens group with respect to the d line.

14. An imaging lens as defined in claim 1 that satisfies Conditional Formula (2-1) below:

$$-0.95<f/f1<-0.65 \quad (2\text{-}1)$$

wherein f is the focal length of the entire system, and f1 is the focal length of the first lens group.

15. An imaging apparatus equipped with an imaging lens as defined in claim 1.

16. An imaging lens consisting of, in order from the object side to the image side:
a first lens group having a negative refractive power as a whole;
a second lens group having a positive refractive power as a whole;
an aperture stop;
a third lens group having a positive refractive power as a whole; and
a fourth lens group having a negative refractive power as a whole;
the first lens group consisting only of two or more negative lenses and the lens surface most toward the object side within the first lens group being convex;
the second lens group having a positive lens at the most object side thereof, and the number of positive lenses within the second lens group being two;
the third lens group having a negative lens with a concave surface toward the object side at the most object side thereof;
the fourth lens group consisting only of a single negative lens, the fourth lens group moving from the object side to an image side when changing focus from an object at infinity to an object at an extremely close distance; and
only the fourth lens group moving during focusing operations.

17. An imaging lens as defined in claim 16, wherein:
Conditional Formula (1) below is satisfied:

$$-90<vdG2P1-vdG2P2<-15 \quad (1)$$

wherein vdG2P1 is the Abbe's number of the positive lens most toward the object side within the second lens group with respect to the d line, and vdG2P2 is the Abbe's number of the second positive lens from the object side within the second lens group with respect to the d line.

18. An imaging eqquipped with an imaging lens as divined in claim 16.

19. An imaging lens consisting of, in order from the object side to the image side:
a first lens group having a negative refractive power as a whole;
a second lens group having a positive refractive power as a whole;
an aperture stop;
a third lens group having a positive refractive power as a whole; and
a fourth lens group having a negative refractive power as a whole;
the first lens group consisting only of two or more negative lenses;
the second lens group having a positive lens at the most object side thereof, and the number of positive lenses within the second lens group being two;
the third lens group having a negative lens with a concave surface toward the object side at the most object side thereof;
the fourth lens group consisting only of a single negative lens, the fourth lens group moving from the object side to an image side when changing focus from an object at infinity to an object at an extremely close distance;
only the fourth lens group moving during focusing operations; and the imaging lens satisfying Conditional Formula (1) below:

$$-90<vdG2P1-vdG2P2<-15 \quad (1)$$

wherein vdG2P1 is the Abbe's number of the positive lens most toward the object side within the second lens group with respect to the d line, and vdG2P2 is the Abbe's number of the second positive lens from the object side within the second lens group with respect to the d line.

20. An imaging apparatus equipped with an imaging lens as defined in claim 19.

* * * * *